April 1, 1969     P. BUCHER     3,435,701
SAFETY STEERING WHEEL
Filed Oct. 26, 1966     Sheet 2 of 3
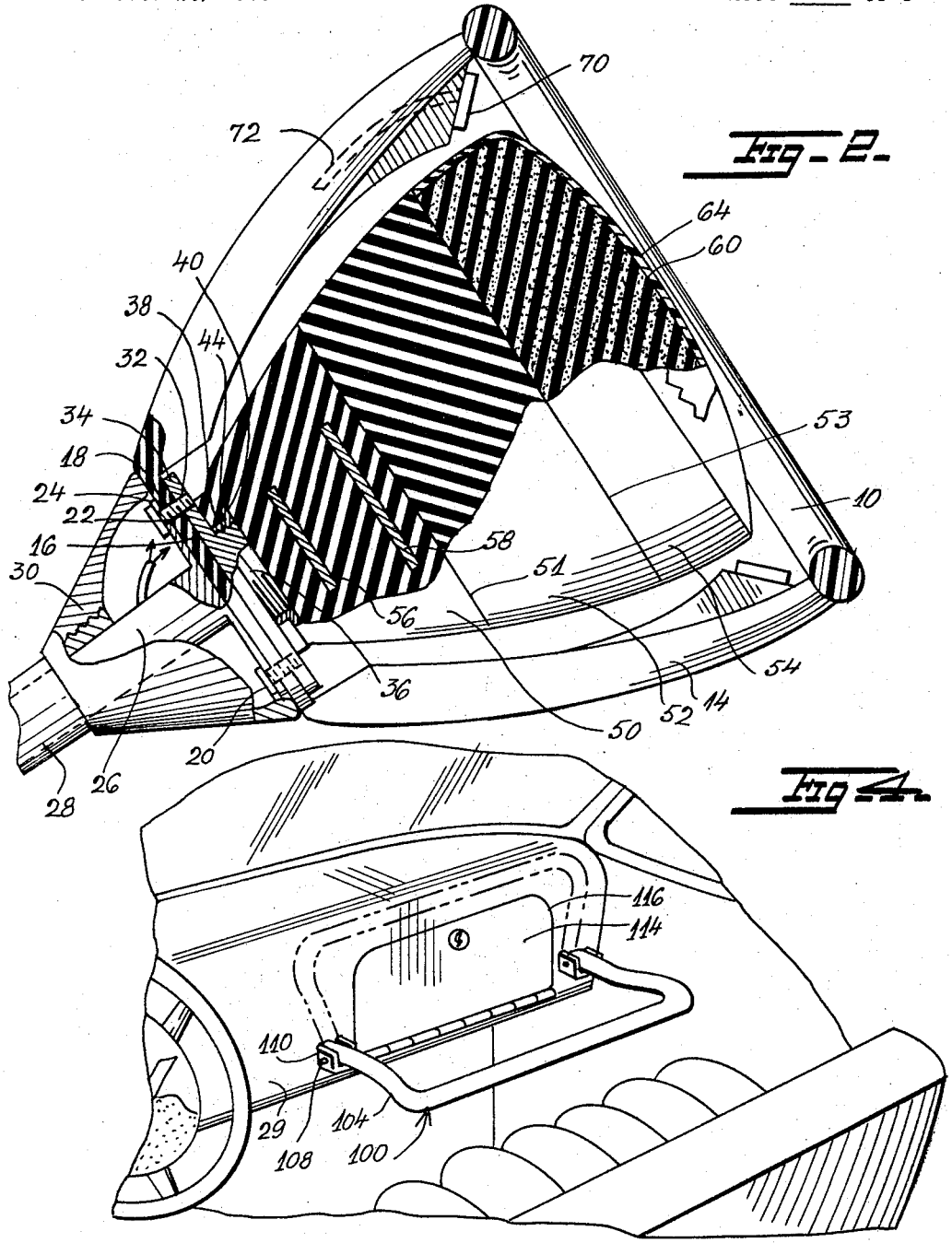
INVENTOR
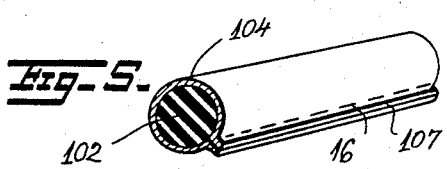

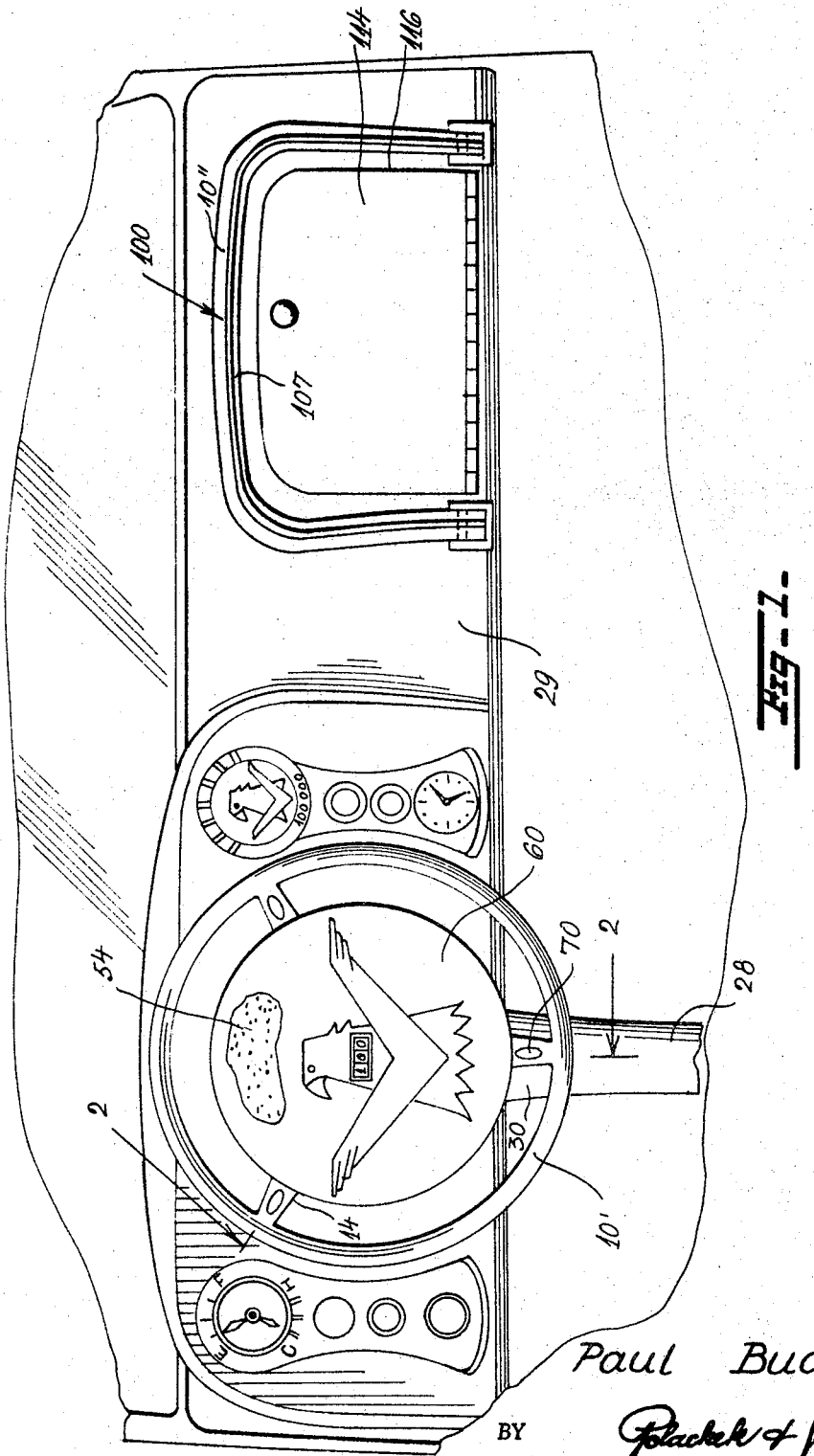

April 1, 1969  P. BUCHER  3,435,701
SAFETY STEERING WHEEL
Filed Oct. 26, 1966  Sheet 3 of 3

INVENTOR
Paul Bucher
BY Polachek & Saulsbury
ATTORNEYS

3,435,701
SAFETY STEERING WHEEL
Paul Bucher, 68-19 31st Ave.,
Jackson Heights, N.Y. 11372
Filed Oct. 26, 1966, Ser. No. 589,604
Int. Cl. B60r 21/02
U.S. Cl. 74—552                             8 Claims

ABSTRACT OF THE DISCLOSURE

A safety steering wheel for an automobile having means for protecting the driver of an automobile from injury by a steering shaft in the event of a collision with an obstacle in the path of the vehicle. The means comprises superimposed resilient pads disposed at the end of the steering post or shaft having progressively more resilience in a direction outwardly from the shaft. The pads are so arranged that in the event of a collision of the vehicle with another vehicle or obstacle of the body of the driver will cause the arms of the steering wheel mounting to bend, while the resilient pads will cushion the driver's body and will prevent penetration by the steering shaft.

---

This invention relates to safety equipment for vehicles such as automobiles, and more particularly concerns a safety steering wheel.

According to the invention, there is provided a steering wheel which is mounted on a recessed hub and connected thereto by spider arms. Within the well, defined by the arms of the wheel mounting, is an assembly of resilient pads disposed at the end of the steering or shaft and having progressively more resilience in a direction outwardly from the shaft. The assembly is arranged so that in the event of a collision of the vehicle with another vehicle or other obstacle the body of the driver will cause the arms of the steering wheel mounting to bend, while the resilient pads will cushion the driver's body and will prevent penetration by the steering shaft.

It is therefore a principal object of the invention to provide effective means for protecting the driver of an automotive vehicle from injury by a steering shaft in the event of a collision with an obstacle in the path of the vehicle.

A further object is to provide a steering wheel assembly with a centrally located resilient cushion including pads of progressively greater resiliency.

Another object is to provide a protective padded hand rail for a passenger in the seat of an automotive vehicle.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is an elevational view of part of the dashboard and steering assembly of a vehicle embodying the invention.

FIGURE 2 is an enlarged vertical sectional view taken on line 2—2 of FIG. 1.

FIGURE 4 is a reduced perspective view of part of the steering assembly and padded hand rail.

FIGURE 5 is an enlarged perspective view of part of the hand rail.

Figure 3:
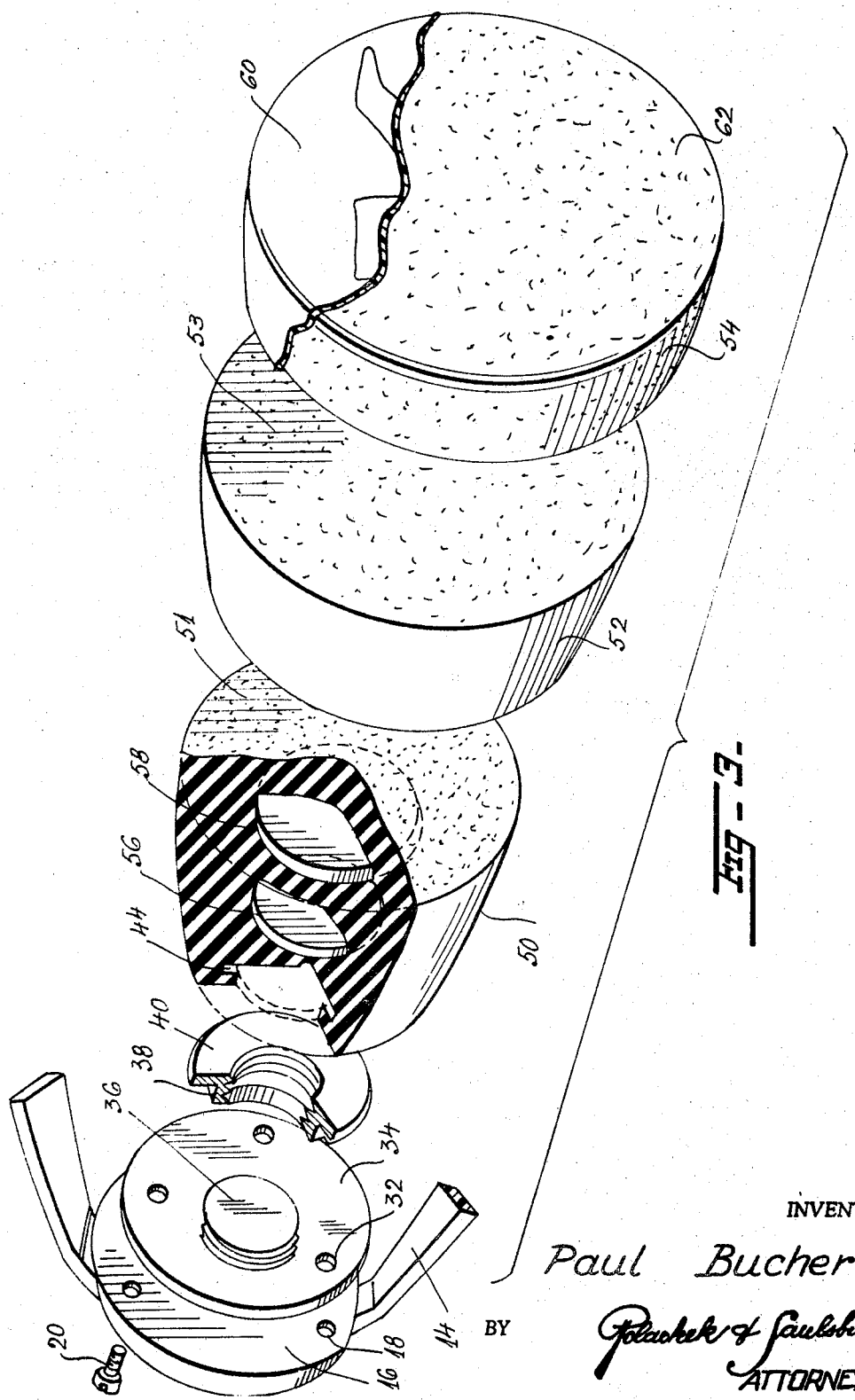
FIGURE 3 is an exploded perspective view of parts of the steering assembly.

Referring to the drawing, there is shown in FIGS. 1, 2 and 4 a circular steering wheel 10 of an automotive vehicle 12. The wheel is provided with a plurality of outwardly flared spider arms 14 which extend downwardly away from the plane of the wheel 10 to define a well. The arms terminate at a plate 16 which is spaced axially from and parallel to the plane of wheel 10. The arms are spaced apart circumferentially of the wheel and plate. The plate 16, arms 14 and wheel 10 are integrally molded of plastic material which is tough and strong, but which will bend under impact as when the wheel 10 is pressed against the body of a driver during a collision of the vehicle with some obstacle.

The plate 16 has circumferentially spaced holes 18 which receive bolts 20 inserted through holes 22 in an annular flange 24 integral with the upper end of a rotatable steering shaft 26. Shaft 26 extends axially through fixed steering column 28 of the vehicle. Column 28 extends forward of dashboard 29. A conical nut 30 is screwed on the column 28 to cover and conceal the bolts 20. The threaded ends of the bolts are seated in threaded holes 32 formed in a circular plate 34; see FIGS. 2 and 3. This plate has an axially extending externally threaded stud 36. On this stud screws internally threaded ring 38 formed with radially extending annular flange 40 at one end. Flange 40 engages in circumferential recess 44 formed in the bottom end of a resilient pad 50.

Pad 50 is one of an assembly of three generally cylindrical pads 50, 52 and 54. The pads are progressively softer or more resilient. Pad 54 is made of soft, spongy material such as sponge rubber or plastic; pad 52 is made of slightly stiffer or less resilient rubber or plastic; and pad 40 is still less resilient. The pads have flat sides which abut each other and they are cemented together by any suitable adhesive 51, 53.

Embedded in pad 50 are two rigid disks 56, 58. Outer disk 58 is larger in diameter than disk 56. The disks are spaced apart axially of the pad 50. The disks 56, 58 are disposed in axial alignment with the stud 36 and with the steering shaft 26. These disks will help prevent penetration of the steering shaft 26 axially through the assembly of pads in the event of a violent impact of the body of the driver of the vehicle against the steering wheel.

The outer end 62 of pad 54 is convex. The outer sides of pad 54 may be covered with a thin flexible decorative plastic cover 60. The entire assembly of pads 50, 52 and 54 are disposed inside the well defined by the flaring steering arms 14 between the planes of wheel 10 and the plate 34. By this arrangement the body of the driver is well protected from the steering shaft in the event of collision as pointed out above. The arms 14 of the assembly will bend to retract the wheel in the event of such collision. The pad 54 will contact the driver's body to protect him. Nut 30 will serve as an abutment for plate 16 and arms 14. Horn buttons 70 with connecting wires 72 may be mounted on arms 14.

In order to protect a passenger riding alongside the driver there may be provided a handrail 100 shown in FIGS. 1 and 4. This hand rail is generally rectangularly U-shaped and is formed from a resilient rubber bar 102 enclosed in a leather or plastic cover 104 which may be secured by stitching 106 around the bar; see FIG. 5. Ends of the bar are pivotally engaged by pintles 108 on brackets 110 secured to the dashboard 29. The brackets are located at opposite ends of door 114 which closes glove compartment 116.

Normally the rail will assume the upright position shown in FIG. 1 flat against the dashboard. The rail can be turned downwardly 90° to the horizontal position shown in FIG. 4, and it can be grasped by a passenger of the vehicle to brace himself in the event of a collision. During a collision the rail will be thrown rearwardly and down to facilitate its being grasped by the passenger. If the passenger is wearing a seat belt, the use of the hand rail 100 will cooperate therewith in protecting or at least minimizing injury to the passenger using both the rail and seat belt.

There have thus been provided safety equipment for protecting or at least minimizing injury to both driver and a front seat passenger next to the driver, during a collision.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. Safety equipment for an automotive vehicle having a dashboard and a hollow steering column extending rearwardly of the dashboard at a driver's position, comprising a rotatable steering shaft in said column, said shaft having an upper end extending axially beyond said column, a steering wheel disposed in a plane perpendicular to the axis of said shaft, a flange secured to the outer end of the axis of said shaft, a plate, a plurality of arms secured at opposite ends to the steering wheel and plate respectively, circumferentially spaced position, means securing said plate to the flange at the outer end of said steering shaft, an assembly of generally cylindrical resilient pads, and means securing said assembly of pads to said plate, said arms of the plate defining a wall with said assembly of pads being located in said wall in axial alignment with said shaft, so that upon impact of the driver's body against the steering wheel the pads protect the driver's body against the steering wheel the pads protect the driver's body from contact with the outer end of said shaft, a nut screwed on the column and abutting said plate to reinforce the plate, said arms being sufficiently resilient to bend upon impact of the driver's body with the steering wheel so that the driver's body contacts the outermost one of the pads.

2. Safety equipment for an automotive vehicle as recited in claim 1 and a plurality of rigid disks embedded in the pad closest to the steering shaft, said disks being spaced apart and axially aligned with said shaft to serve as shields between the shaft and the outermost one of the pads.

3. Safety equipment for an automotive vehicle as recited in claim 1 the means for securing the assembly of pads to said plate comprising an internally threaded ring having an annul or radial other flange at one end engaged in a recess on the pad closest to the steering shaft, and a second plate interposed between the first named plate and the ring, said second plate having an externally threaded axial stud extending into and engaged with said ring.

4. Safety equipment for an automotive vehicle as recited in claim 3, wherein the means for securing the first named plate to the first named flange at the outer end of the steering shaft comprises circumferentially spaced registering holes in both plates and the first flange, and bolts engaged in the registering holes.

5. Safety equipment for an automotive vehicle as recited in claim 1, said arms being sufficiently resilient to bend upon the impact of the driver's body with the steering wheel so that the driver's body contacts the outermost one of the pads, and a plurality of rigid disks embedded in the pad closest to the steering shaft, said disks being spaced apart and axially aligned with said shaft to serve as shields between the shaft and the outermost one of the pads.

6. Safety equipment for an automotive vehicle as recited in claim 5, wherein the means for securing the assembly of pads to said plate comprises an internally threaded ring having an annular radial flange at one end engaged in a recess on the pad closest to the steering shaft, and a second plate interposed between the first named plate and said ring, said second plate having an externally threaded axial stud extending into and engaged with said ring.

7. Safety equipment for an automotive vehicle as recited in claim 6, wherein the means for securing the first named plate to the first named flange at the outer end of the steering shaft comprises circumferentially spaced registering holes in both plates and the first flange, and bolts engaged in the registering holes.

8. Safety equipment for an automotive vehicle as recited in claim 1, further comprising a generally U-shaped resilient rail pivotally secured at its free ends to the dashboard and disposed to be grasped by a passenger seated next to the driver of the vehicle.

References Cited

UNITED STATES PATENTS

| 1,784,733 | 12/1930 | Kraft | 74—552 |
| 3,087,352 | 4/1963 | Daniel | 74—552 |

HALL C. COE, *Primary Examiner.*

U.S. Cl. X.R.

180—78, 150